US008332230B2

(12) United States Patent
Ryan, Jr.

(10) Patent No.: US 8,332,230 B2
(45) Date of Patent: Dec. 11, 2012

(54) FRAUD DETECTION MECHANISM ADAPTED FOR INCONSISTENT DATA COLLECTION

(75) Inventor: Frederick W. Ryan, Jr., Oxford, CT (US)

(73) Assignee: Pitney Bowes Inc., Stamford, CT (US)

( * ) Notice: Subject to any disclaimer, the term of this patent is extended or adjusted under 35 U.S.C. 154(b) by 2038 days.

(21) Appl. No.: 10/941,539

(22) Filed: Sep. 15, 2004

(65) Prior Publication Data

US 2006/0026102 A1 Feb. 2, 2006

Related U.S. Application Data

(60) Provisional application No. 60/591,822, filed on Jul. 28, 2004.

(51) Int. Cl.
*G06Q 10/00* (2012.01)
*G06Q 20/00* (2012.01)
*G06Q 30/00* (2012.01)
*G06F 21/00* (2006.01)
*G06F 17/00* (2006.01)

(52) U.S. Cl. ............... 705/1.1; 705/57; 705/60; 705/61; 705/62; 705/330; 705/401

(58) Field of Classification Search .................... 705/57, 705/60–62, 400–411, 1.1, 330
See application file for complete search history.

(56) References Cited

U.S. PATENT DOCUMENTS

| | | | | |
|---|---|---|---|---|
| 6,516,056 | B1 * | 2/2003 | Justice et al. | 379/145 |
| 6,527,178 | B1 * | 3/2003 | Gordon et al. | 235/385 |
| 6,854,656 | B2 * | 2/2005 | Matsumori | 235/472.01 |
| 2003/0101143 | A1 * | 5/2003 | Montgomery et al. | 705/62 |
| 2003/0115152 | A1 * | 6/2003 | Flaherty | 705/65 |

FOREIGN PATENT DOCUMENTS

| | | | |
|---|---|---|---|
| CA | 2045732 | A * | 12/1992 |
| EP | 512413 | A2 * | 11/1992 |
| EP | 1017020 | A2 * | 7/2000 |
| EP | 1047025 | A2 * | 10/2000 |

* cited by examiner

*Primary Examiner* — Fadey Jabr
(74) *Attorney, Agent, or Firm* — Brian A. Lemm; Steven J. Shapiro; Charles R. Malandra, Jr.

(57) ABSTRACT

Fraud detection mechanisms and methods that are adapted for inconsistent data collection are provided. Data is analyzed to determine normal operational variations from ideal system behavior. Profiles are developed for each individual sender, e.g., the number of multiple scans performed per confirmation number generated by each sender, and other parameters, such as delivery areas, e.g., the number of multiple scans performed per specific geographic area. If the sender's profile differs significantly from the normal operational variations, there is an indication of potential fraudulent activity and an investigation can be initiated. By analyzing a combination of sender and delivery scan data with system wide scan data, the effect of inconsistent data is minimized to significantly reduce the number of erroneous indications of fraudulent activity while still providing a high level of fraud detection.

22 Claims, 5 Drawing Sheets

DELIVERY SCAN DATA

| AREA | TOTAL SCANS | MULTIPLE SCAN % | MULTIPLE SCAN WITHIN 1 MINUTE % | MULTIPLE SCAN WITHIN SAME DAY % | MULTIPLE SCAN ON DIFFERENT DAY % | MORE THAN 3 SCANS % |
|---|---|---|---|---|---|---|
| NATIONAL | 2536948 | 4.8 | 3.5 | 4.1 | 0.7 | 0.1 |
| AREA 1 | 11475 | 4.3 | 3.1 | 3.9 | 0.4 | 0.1 |
| AREA 2 | 8079 | 14.4 | 10.9 | 11.6 | 2.8 | 0.3 |
| AREA 3 | 18437 | 5.1 | 3.8 | 4.6 | 0.5 | 0.1 |
| AREA N | | | | | | |

FIG.3

SENDER SCAN DATA

| AREA | TOTAL SCANS | MULTIPLE SCAN % | MULTIPLE SCAN WITHIN 1 MINUTE % | MULTIPLE SCAN WITHIN SAME DAY % | MULTIPLE SCAN ON DIFFERENT DAY % | MORE THAN 3 SCANS % |
|---|---|---|---|---|---|---|
| NATIONAL | 2536948 | 4.8 | 3.5 | 4.1 | 0.7 | 0.1 |
| SENDER A | 115 | 5.2 | 4.3 | 5.2 | 0.0 | 0.0 |
| SENDER B | 2 | 100.0 | 50.0 | 100.0 | 0.0 | 0.0 |
| SENDER C | 52 | 23.1 | 23.1 | 23.1 | 0.0 | 1.9 |
| SENDER D | 17 | 5.9 | 5.9 | 5.9 | 0.0 | 0.0 |
| SENDER E | 94 | 23.4 | 3.2 | 9.6 | 13.8 | 10.6 |
| | | | | | | |

FIG.4

SENDER C SCAN DATA

| AREA | TOTAL SCANS | MULTIPLE SCAN % | MULTIPLE SCAN WITHIN 1 MINUTE % | MULTIPLE SCAN WITHIN SAME DAY % | MULTIPLE SCAN ON DIFFERENT DAY % | MORE THAN 3 SCANS % |
|---|---|---|---|---|---|---|
| SENDER C | 52 | 23.1 | 23.1 | 23.1 | 0.0 | 1.9 |
| AREA 1 | 12 | 8.3 | 3.1 | 3.9 | 4.4 | 0.0 |
| AREA 2 | 32 | 18.8 | 18.8 | 18.8 | 0.0 | 3.1 |
| AREA 3 | 3 | 0.0 | 0.0 | 0.0 | 0.0 | 0.0 |
| | | | | | | |

SENDER E SCAN DATA

| AREA | TOTAL SCANS | MULTIPLE SCAN % | MULTIPLE SCAN WITHIN 1 MINUTE % | MULTIPLE SCAN WITHIN SAME DAY % | MULTIPLE SCAN ON DIFFERENT DAY % | MORE THAN 3 SCANS % |
|---|---|---|---|---|---|---|
| SENDER E | 94 | 23.4 | 3.2 | 9.6 | 13.8 | 10.6 |
| AREA 1 | 12 | 25.0 | 8.3 | 8.3 | 16.7 | 16.7 |
| AREA 2 | 27 | 44.4 | 11.1 | 11.1 | 33.3 | 14.8 |
| AREA 3 | 15 | 20.0 | 6.7 | 6.7 | 13.3 | 13.3 |
| | | | | | | |

FIG.6

FRAUD DETECTION MECHANISM ADAPTED FOR INCONSISTENT DATA COLLECTION

CROSS REFERENCE TO RELATED APPLICATIONS

This application claims the benefit of U.S. Provisional Application Ser. No. 60/591,822, filed on Jul. 28, 2004, the specification of which is hereby incorporated by reference.

FIELD OF THE INVENTION

The invention disclosed herein relates generally to fraud detection, and more particularly to a fraud detection mechanism adapted for inconsistent data collection.

BACKGROUND OF THE INVENTION

There are several ways that mail pieces can be marked to evidence payment of postage for delivery of the mail piece. A mail piece could include, for example, letters, magazines, postcards, packages, parcels, etc. For example, a stamp could be applied to the mail piece, or a mailing machine could be used to print a postage meter indicium on the mail piece or a label applied to the mail piece. With the proliferation of communications networks, e.g., the Internet, it is also possible to print an indicium, either directly on the mail piece or on a label that is affixed to the mail piece, that evidences payment of postage using a personal computer coupled to the Internet and a general purpose printer coupled to the computer.

Regardless of which method is utilized to evidence payment of postage, a verification system is provided to ensure that the payment evidence is both authentic, i.e., not a counterfeit, and original, i.e., not a duplicate. For example, stamps are cancelled by a postal mark, thereby preventing them from being reused. Postal meter indicia includes a two-dimensional (2D) barcode and certain human-readable information. Some of the data included in the barcode could include, for example, the meter manufacturer identification, meter model identification, meter serial number, values for the ascending and descending registers of the meter, postage amount, and date of mailing. In addition, a digital signature may be required to be created by the meter for each mail piece and placed in the digital signature field of the barcode. Verification of the signature provides authentication of an indicium, while other portions of the included data can help detect duplicate indicia.

In some forms of postage, fraud detection is performed utilizing a confirmation number applied to each mail piece, along with an indicium, that uniquely identifies each mail piece for which postage has been paid. Upon delivery of the mail piece, the letter carrier, i.e., delivery person or "postman," that is delivering the mail piece is required to scan the confirmation number, and the data is stored in a central database. Thus, in theory, if a confirmation number is scanned more than once, it is an indication that the same confirmation number has been improperly utilized more than once, thereby attempting to defraud the delivery service of payment for the second mail piece.

Fraud detection mechanisms work well if the data collection methods are consistent enough to provide accurate data. For example, fraud detection mechanisms utilized for credit cards, phone cards, and cellular telephones rely on the accuracy of data to allow fraud detection decisions to be made based upon simple rules. For example, a large increase in the frequency of purchases or calls may indicate a stolen credit card or phone card. Similarly, transactions that occur within a short time period spread over large geographic distances may also indicate fraud. Such fraud detection mechanisms, however, assume the data is correct and base decisions upon that assumption. This is largely due to the fact that there is a closed loop between the payer and the service provider/biller. Thus, if a transaction was processed, e.g., purchase with a credit card, call made using a phone card or cellular telephone, the data with respect to that transaction is "hard" data, i.e., each transaction is typically unique and has actually occurred.

Unfortunately, the data collected from the scanning system for the mail piece delivery fraud detection system described above is inconsistent and therefore may not be completely accurate, thereby leading to erroneous decisions about fraudulent use of confirmation numbers for delivery of mail pieces. For example, failure by the letter carrier to scan the confirmation number will completely negate the fraud detection mechanism; therefore, it is imperative that the letter carrier scans the confirmation number upon delivery of the mail piece. To ensure this, most delivery services will discipline letter carriers if the confirmation numbers are not scanned. As a result, some letter carriers will scan the confirmation number on a mail piece multiple times to ensure that it has been scanned properly. These multiple scans may occur within a short period of time, e.g., in rapid succession when a mail piece is delivered, or over a longer period of time, e.g., prior to leaving a central facility to deliver the mail pieces and at the actual time of delivery. Thus, multiple scans may be recorded for the same mail piece. Another situation that can result in multiple scans for the same mail piece occurs if the letter carrier scans the mail piece and then can not actually deliver the mail piece, thereby requiring multiple delivery attempts. For example, if the letter carrier scans the mail piece upon approaching the intended recipient's door, and the intended recipient is not at home to accept the mail piece, the letter carrier must make a second delivery attempt. When the mail piece is delivered the next day, it may again be scanned, resulting in multiple scans of the same mail piece. This inconsistency of the data collection makes the data difficult to use for fraud detection. For example, two delivery scans of a confirmation number within a short period of time could indicate either (i) the label including the confirmation number and associated indicium has been copied, and two mail pieces have been sent using the same confirmation number and indicium (but only paid for once), or (ii) the letter carrier scanned the confirmation number on the same mail piece twice. Similarly, two scans of a confirmation number separated by some time period could indicate either (i) a copied confirmation number was fraudulently used, or (ii) more than one attempt was made to deliver the mail piece. Duplicate data may be, therefore, the result of either improper system operation or fraudulent activity.

Thus, if each time a confirmation number was scanned more than once resulted in a determination of possible fraudulent activity, a large number of unnecessary fraud investigations would occur. To reduce the number of fraud investigations based on multiple scans of the same confirmation number, current fraud detection mechanisms only make a decision of potentially fraudulent activity if a high number, such as, for example, five or more, of delivery scans occur for the same confirmation number. This solution, however, has inherent problems in that it may not detect actual fraudulent activity. For example, the confirmation numbers can be copied one, two, three or even four times and reused to send multiple mail pieces to different locations, while only paying for delivery of a single mail piece. As a result, the potential for large scale fraud to be committed without fear of being detected exists.

Thus, there exists a need for a fraud detection mechanism that is adapted for inconsistent data collection.

SUMMARY OF THE INVENTION

The present invention alleviates the problems associated with the prior art and provides a fraud detection mechanism that is adapted for inconsistent data collection.

According to embodiments of the present invention, the data from scanned confirmation numbers is collected and stored in a database. The data is analyzed to determine normal operational variations from ideal system behavior, e.g., the percentage of confirmation numbers that are scanned multiple times. Profiles are developed for each individual sender, e.g., the number of multiple scans performed per confirmation number generated by each sender, and for scanning activity that meets predetermined parameters, such as delivery areas, e.g., the number of multiple scans performed per letter carrier route. If the sender's profile differs significantly from the normal operational variations, there is an indication of potential fraudulent activity and an investigation can be initiated. For example, if a large percentage of a particular sender's confirmation numbers have multiple delivery scans, while only a small percentage of all confirmation numbers are scanned multiple times, there is an indication of possible fraudulent activity by that sender. Similarly, if the data for a specific confirmation number differs significantly from the profile for data in its delivery area, there is an indication of potential fraudulent activity and an investigation of that confirmation number can be initiated. For example, if multiple delivery scans occur for a single confirmation number on a letter carrier route where confirmation numbers are rarely or never scanned more than once, there is an indication of possible fraudulent activity. By analyzing a combination of sender and delivery scan data with system wide scan data, the effect of inconsistent data is minimized to significantly reduce the number of erroneous indications of fraudulent activity while still providing a high level of fraud detection.

Therefore, it should now be apparent that the invention substantially achieves all the above aspects and advantages. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

DESCRIPTION OF THE DRAWINGS

The accompanying drawings illustrate a presently preferred embodiment of the invention, and together with the general description given above and the detailed description given below, serve to explain the principles of the invention. As shown throughout the drawings, like reference numerals designate like or corresponding parts.

FIG. 3 illustrates an example of a scan profile table for delivery scan data created during the processing illustrated in FIG. 2;

FIG. 4 illustrates an example of a scan profile table for sender scan data created during the processing illustrated in FIG. 2;

FIG. 6 illustrates examples of sender specific scan data table by geographic area for two different senders created during the processing illustrated in FIG. 5.

DETAILED DESCRIPTION OF THE PRESENT INVENTION

Figure 1:
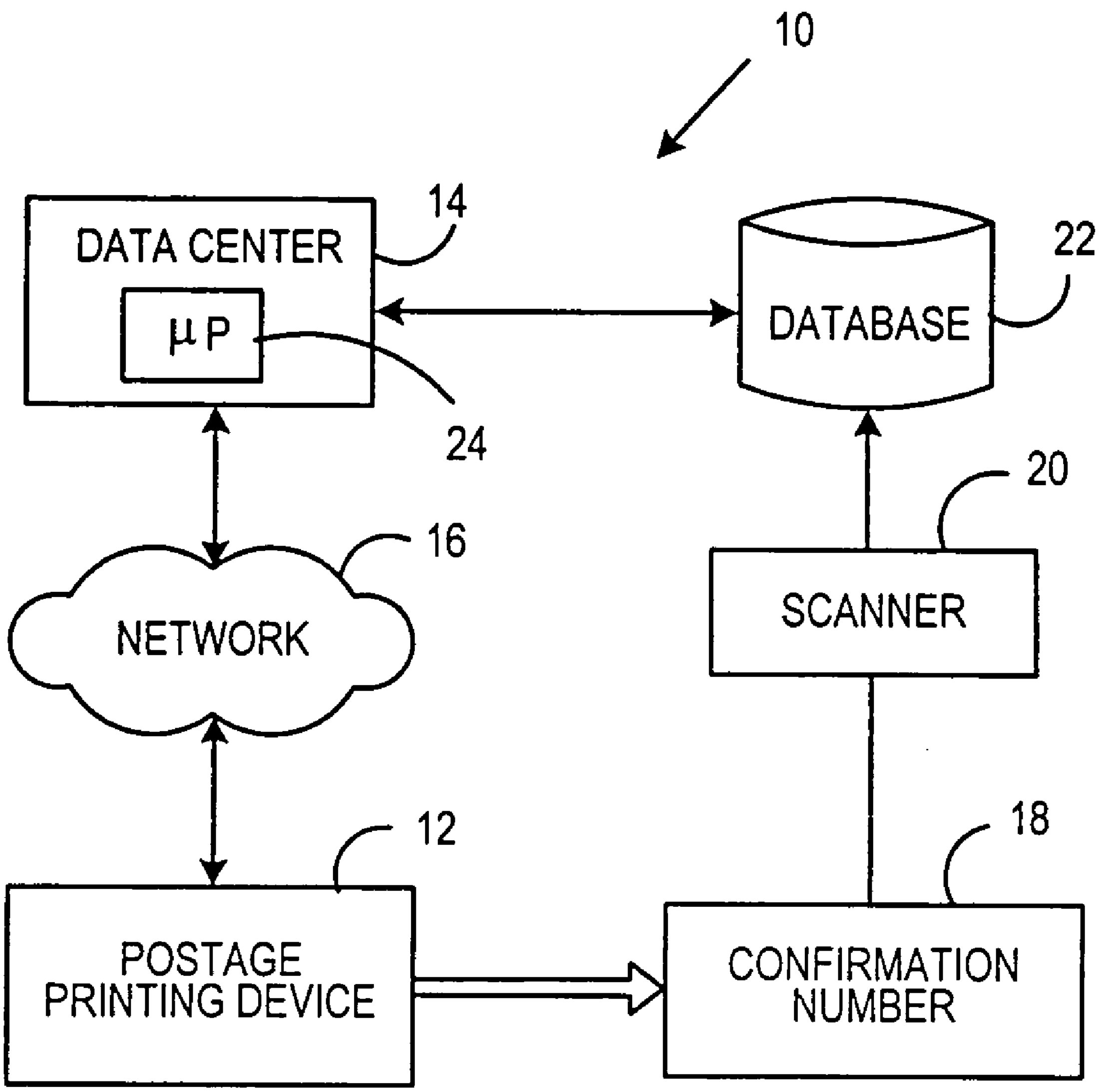
FIG. 1 illustrates in block diagram form an example of a postage payment/verification system in which the present invention can be utilized.

In describing the present invention, reference is made to the drawings, wherein there is seen in FIG. 1 an example of portions of a postage payment/verification system 10 in which the present invention can be utilized. A postage printing device 12, such as, for example, a personal computer with an attached standard printer, or a special purpose postage printing device, communicates with a data center 14 via a network 16, such as, for example, the Internet. When a sender desires to send a mail piece, the sender will contact the data center 14, using the postage printing device 12, to request postage for delivery of the mail piece. Data center 14 includes one or more general and/or special purpose processors, such as, for example, microprocessor 24, that are utilized to control and perform the operations of the data center 14 as described herein. Data center 14 generates an indicium that evidences payment of postage which can then be printed, either directly on the mail piece or on a label that can be affixed to the mail piece, by the postage printing device 12. A delivery confirmation number 18 is also generated that uniquely identifies the mail piece and is applied to the mail piece. Confirmation number 18 could be implemented as a 1-D or 2-D barcode, a text string of alphanumeric characters, or any other type of implementation that can be utilized to uniquely identify each mail piece. Each confirmation number 18 is linked with the sender, therefore, based upon the confirmation number 18 it is possible to identify the sender of the mail piece. Upon delivery of the mail piece, the confirmation number 18 is scanned by the letter carrier using a scanner 20 and the information is stored in a database 22. It should be understood that the use of delivery confirmation numbers is not limited to postage generated on-line, and can also be used with other postage dispensing systems such as, for example, postage meters. As previously described, the scan data may be inconsistent and therefore not suitable by itself for use in fraud detection.

Figure 2:
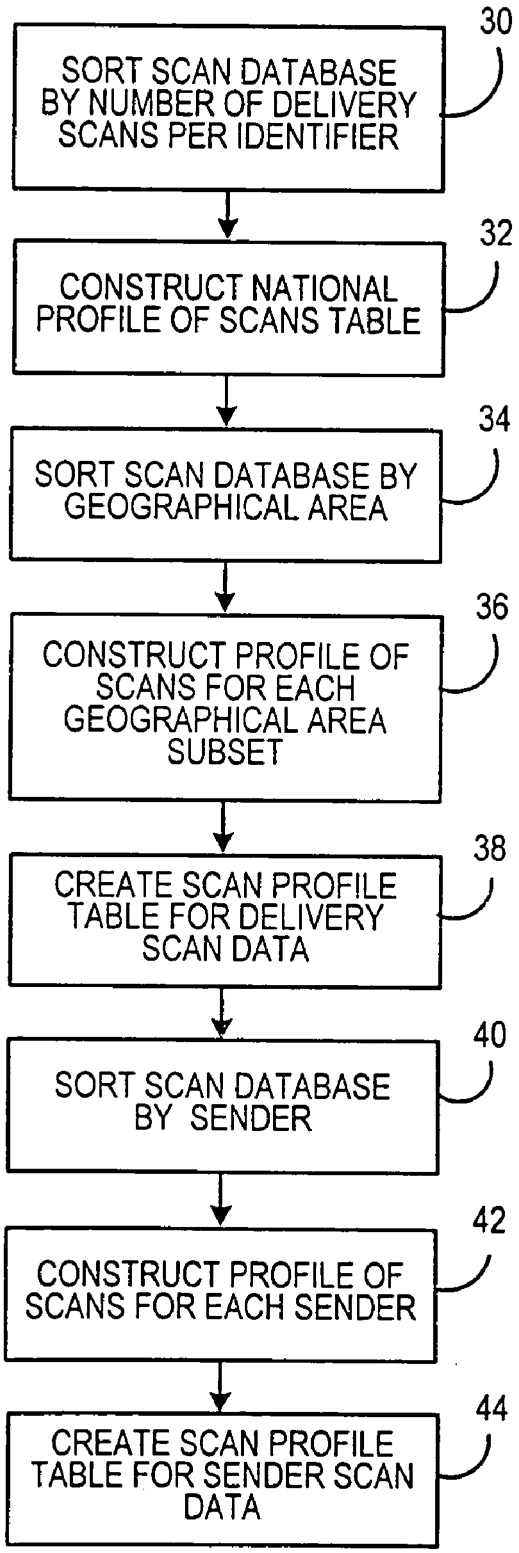
FIG. 2 illustrates in flow chart form the processing performed for creating a scan profile table based on delivery scan data and sender scan data according to an embodiment of the invention.

According to an embodiment of the invention, the inconsistencies in scanning practices can be mitigated by determining normal variations in scan data and identifying senders whose scan data varies significantly beyond the normal variations. Normal variations in scan data are determined based upon aggregate scan data. The aggregate scan data is utilized to create a scan profile table for use as the basis for determining normal variations. FIG. 2 illustrates in flow chart form the processing performed for creating a scan profile table based on delivery scan data according to an embodiment of the invention. The processing as described in FIG. 2 can be performed, for example, by the data center 14 utilizing the data stored in the database 22. As shown in FIG. 2, at step 30 the contents of database 22 is sorted based upon the number of scans for each confirmation number 18 over a given period of time, such as, for example, one or two months, that meet a predetermined first parameter. For example, some parameters that may be used can include a specific geographic region, a class of service, e.g., first class, second class, etc., the method of postage evidencing used, etc. Suppose, for example, that the predetermined parameter is scan data from a geographic region. Preferably, the scan data used is from all geographic regions in which the delivery service, e.g., postal service, delivers mail pieces. For example, the geographic area for the United States Postal Service (USPS) may be all of the United States. At step 32, a profile of scans table is created using the data sorted in step 30 for the entire geographic area from which the scan data is used. Thus, for example, if data from all of the U.S. was used, the table would be a national profile of scans table. This table includes data such as, for example, the total number of confirmation numbers 18 scanned; the percentage of confirmation numbers 18 that were scanned more than once that have a "delivered" status, i.e., the mail piece has actually been delivered; the percentage of confirmation numbers 18 that were scanned as delivered multiple times within a specified short period of time, such as, for example, one minute; the percentage of confirmation numbers 18 that were scanned as delivered multiple times within the same day; the percentage of confirmation numbers 18 that were scanned as delivered multiple times over multiple days; the percentage of confirmation numbers 18 that were scanned as delivered more than a predetermined amount of times, such as, for example, 3 or 4; the percentage of confirmation numbers 18 that were scanned as delivered in multiple geographic locations; and any other metric that might aid in fraud detection.

At step 34, the contents of database 22 is again sorted, this time based upon the number of scans for each confirmation number 18 over the given period of time that meet a second predetermined parameter, where the second parameter is a specific subset of the first parameter used in step 30. For example, for a first parameter of class of service, a second parameter subset may be based on weight, zone based rate, time to deliver, etc. For a first parameter of a geographic region, a second parameter subset may be based on small geographic area subsets of the geographic area used in step 30. Each geographic area subset can correspond to a large geographic area or a small geographic area. For example, a large geographic area could be defined as the entire area having the same first three digits for the zip code, while a small geographic area could be defined as a single letter carrier's specific delivery route. It should be understood that any number of subsets may be used as desired. In step 36, a profile of scans table, including data similar to the profile created above in step 32, is created using the data sorted in step 34 for each geographic area subset. In step 38, a single Scan Profile Table for delivery scan data is created by combining the profile tables created in step 32 (for the first parameter, e.g., entire geographic area) and in step 36 (for the second parameter, e.g., each geographic area subset) into a single table. An example of such a table is illustrated in FIG. 3. It should be understood that the Scan Profile Table for the delivery scan data can also include more specific data, such as, for example, the name of the letter carrier that delivered the package, the day of delivery, etc. Such data would be useful, for example, in situations where different letter carriers deliver mail pieces on the same delivery route.

In step 40, the database 22 is again sorted, this time based upon sender information. It should be noted that the confirmation numbers 18 need not provide the specific identify of the sender, but instead need only be linked to a specific sender. It may be necessary, therefore, to use other databases that relate the specific identity of the sender to each confirmation number 18. Such databases currently exist for Internet Postage Evidencing Systems approved by the USPS. In step 42, a profile of scans table, including data similar to the profile created above in step 32, is created using the data sorted in step 34 for each sender. In step 44, a single Scan Profile Table for sender scan data is created by combining the profile tables created in step 42 for each sender into a single table. An example of such a table is illustrated in FIG. 4. As illustrated in FIG. 4, the Scan Profile Table for sender scan data also can include the national profile for the delivery scan data on the first line.

Figure 5:
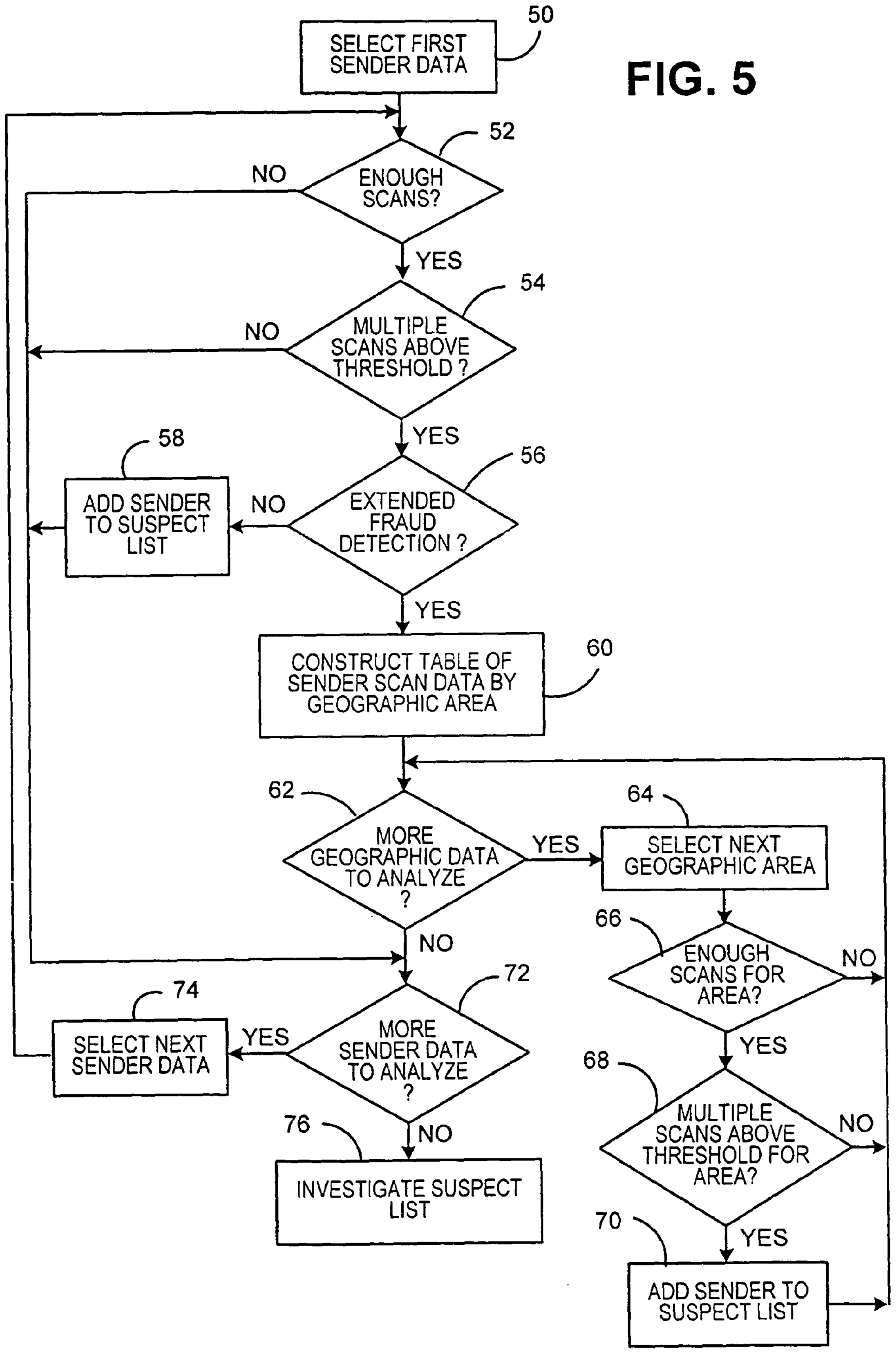
FIG. 5 illustrates in flow chart form the processing performed to identify possible fraudulent activity according to an embodiment of the invention.

Referring now to FIG. 5, there is illustrated in flow chart form the processing performed to identify possible fraudulent activity using the Scan Profile Tables previously created. Preferably, each row of the Scan Profile Table for sender scan data, created in step 44 of FIG. 2, is processed sequentially to determine if possible fraudulent activity is occurring with respect to each respective sender. In step 50, data for the first sender is selected for analysis. Using the example illustrated in FIG. 4, the data for the first sender, identified as senderA, is located in the second row of the table. At step 52, it is determined if the total number of scans for that sender exceeds some predetermined minimum number. In many cases, the number of total scans for a sender will be relatively small, such as, for example, five or less. In situations where there are very few total number of scans, it is difficult to draw any conclusions regarding fraudulent activity based on such a small sample size. In addition, it may not be cost effective for the carrier, e.g., USPS, to investigate all senders that have only sent one or two packages fraudulently. If there are not enough scans for the selected sender, then processing proceeds to step 72 to determine if there is more sender data to analyze, i.e., if there are additional rows in the Scan Profile Table for sender scan data.

If it is determined in step 52 that there are a sufficient number of total scans for the selected sender, then in step 54 it is determined if the selected sender's multiple scan rate (from column three, Multiple Scan %, of the Scan Profile Table illustrated in FIG. 4) is greater than a threshold value. Preferably, the threshold value is set high enough above the national multiple scan rate to be significant. As a result, the threshold value may have to be set based upon the total number of scans for the selected sender. For example, the threshold for a sender with 100 scans may be set to 5% above the national scan percentage, while the threshold for a sender with only 20 scans may be set to 20% above the national scan percentage. If in step 54 it is determined that the selected sender's multiple scan rate is not above the threshold value for that sender, then processing proceeds to step 72 to determine if there is more sender data to analyze. If it is determined in step 54 that the selected sender's multiple scan rate is above the threshold value for that sender, then in step 56 it is determined if an extended fraud detection check is required. An extended fraud detection check includes a more detailed analysis of the scan data, and may be necessary since simple measurements of multiple scans against a threshold value may not be sufficient to determine if fraudulent activity is actually occurring. For example, a sender might ship most of their mail pieces to an area where multiple scanning of mail pieces is common, thereby inflating the sender's multiple scan percentage. Whether or not extended fraud checking is required could be set as a system wide parameter, on an individual basis, as a parameter based upon sender specific data, or other reasons as deemed necessary. If in step 56 it is determined that an extended fraud detection check is not required, i.e., the simple threshold determination is sufficient to indicate possible fraudulent activity and the data indicates that the selected sender may be involved in possible fraudulent activity based on the number of multiple scans performed for mail pieces sent by the selected sender, then in step 58 the selected sender's name is added to a suspect list that identifies senders that may be involved in fraudulent activity. Adding the selected sender to the suspect list can be done only with the sender's identifier, e.g., name, account number, etc., or can also include adding additional data related to the sender, such as, for example, entries from the Scan Profile Table for the sender. When the selected sender's name has been added to a suspect list in step 58, then processing proceeds to step 72 to determine if there is more sender data to analyze.

If in step 56 it is determined that an extended fraud detection check is required, then in step 60 a sender specific table of scan data by geographic area is created. This sender specific table enables the sender's data to be analyzed by each geographic area. As a result, a more accurate assessment of whether or not a sender is committing fraud can be performed. FIG. 6 illustrates two examples of the table created in step 60 for senderC and senderE from the Scan Profile Table for sender scan data illustrated in FIG. 4. As shown in FIG. 6, the table for each sender includes similar data to that as the Scan Profile Tables based on data for the specific sender for each geographic area. Accordingly, a more detailed analysis of each sender's data can be performed based on each geographic area. The analysis occurs for each sender individually based on the specific sender's scan data from the sender specific table. In step 62, it is determined if there are geographic areas in the table left to process. If there are more geographic areas in the table left to process, then in step 64 the next geographic area is selected for processing and the data for that geographic area can be analyzed. At step 66, it is determined if the total number of scans in the specified geographic area for that sender exceeds some predetermined minimum number to allow a meaningful conclusion to be drawn, similar to the processing performed as described with respect to step 52. If there are not enough scans for the selected sender in the specified geographic area, then processing returns to step 62 to determine if there are any geographic areas left to process in the sender specific table.

If it is determined in step 66 that there are a sufficient number of total scans for the selected sender in the specified geographic area, then in step 68 it is determined if the selected sender's multiple scan rate in that area is greater than a threshold value for that geographic area (obtained from the Scan Profile Table for delivery scan data illustrated in FIG. 3). The threshold value can be determined similarly to that as previously described with respect to step 54, and may therefore be different for each sender. If in step 68 it is determined that the selected sender's multiple scan rate in that area is not greater than the determined threshold value for that geographic area, then processing returns to step 62 to determine if there are any geographic areas left to process in the sender specific table. If in step 68 it is determined that the selected sender's multiple scan rate in that area is greater than the determined threshold value, thereby indicating that the selected sender may be involved in possible fraudulent activity, then in step 70 the sender's name is added to a suspect list that identifies senders that may be involved in fraudulent activity similar to that as described with respect to step 58.

The advantages of performing the extended fraud detection check can be seen by examining the data in the two example tables illustrated in FIG. 6 and the Scan Profile Table for delivery scan data illustrated in FIG. 2 in light of the process described in FIG. 5 applied to the Scan Profile Table for sender scan data illustrated in FIG. 4. The specific sender scan tables illustrated in FIG. 6 represent the data from two senders: senderC and senderE. Both senders have a significant number of scans and their multiple scan percentages (Column 3) are significantly higher than the national multiple scan percentage (Column 3 from the table of FIG. 3). Note that although senderB's multiple scan percentage is 100% (Column 3 from the table of FIG. 4) the total number of scans is small (only two scans as shown in Column 2 of the table in FIG. 4). It would, therefore, be difficult to draw correct conclusions from such a small amount of data for senderB. Furthermore, even if senderB were committing fraud it is unlikely it would be worth the cost of the investigation to recover any revenue lost due to the fraud. In step 54 of FIG. 5 both senderC and senderE would be identified as a potential source of fraud based on the number of multiple scans for each of these senders being above the threshold limit. However, extended fraud detection techniques reveal that senderC's multiple scans occur mostly in area2 (18.8% from column 3 of the table for senderC scan data illustrated in FIG. 6) where it is common to have a high multiple scan percentage (14.4% from column 3 of the table illustrated in FIG. 3). Thus, the multiple scans for senderC will be within the threshold for each geographic area, resulting in senderC not being added to the suspect list. In contrast, senderE's multiple scan percentage is significantly above the average in all areas (25% vs. 4.3% in area1; 44.4% vs. 14.4% in area2; and 20% vs. 5.1% in area3). Therefore, while simple fraud detection would add both senderC and senderE to the suspect list, extended fraud detection would add only senderE to the suspect list.

Referring again back to FIG. 5, if in step 62 it is determined that there are no more geographic areas in the sender specific table (created in step 60) left to process, then the processing proceeds to step 72 to determine if there is more sender data to analyze in the Scan Profile Table for sender scan data (created in step 44 of FIG. 2). If there is more sender data to analyze in the Scan Profile Table for sender scan data, then in step 74 the data for the next sender in the table is selected and the processing returns to step 52 to repeat for that next selected sender. If in step 72 it is determined that there is no more sender data to analyze, then in step 76 the suspect list is complete and investigations can be conducted of the senders included on the list.

It should be noted that the fraud detection processing can be performed daily, weekly, monthly or any other time period as desired. Additionally, the processing can be performed either by the carrier, e.g., postal service, the party that operates the data center 14, or any other third party that has access to the database 22 as authorized by the postal service. It should be noted that while the above embodiments have been described with respect to multiple scans of delivery confirmation numbers, the invention is not so limited and could also be extended to other data. For example, the number or percentage of forwarded packages, number or percentage of packages with insufficient postage, etc. could also be used for fraud detection. In addition, while the above embodiments have been described with respect to postal delivery confirmation fraud detection, the invention is not so limited and can also be applied to other fraud detection systems, particularly systems where data collection is inconsistent or incomplete. For example, fraud detection systems were the data collected represents only a sample of the items passing through the system, such as the Information Based Indicia Program, can compare the sampled data with aggregate data (e.g., the total amount of postage sampled for a given user versus what is expected for that user given the sampling rate and their total postage purchased). It can also be extended to systems that process other items of value. For example, manufacturer coupon redemption rates for individual merchants could be analyzed to determine if a particular merchant's coupon redemption rates were significantly higher than expected. Each coupon includes a unique identification number (e.g., a fifty cents coupon for soap has a different identification number than a fifty cents coupon for deodorant) that is scanned upon redemption of the coupon. Higher than expected redemption rates might indicate that the merchant might be redeeming the same coupon or copies of the coupon multiple times and pocketing the money, rather than the merchant's customers redeeming the coupons.

Thus, according to embodiments of the present invention, a fraud detection mechanism that is adapted for inconsistent data collection is provided. The data is analyzed to determine normal operational variations from ideal system behavior. Profiles are developed for each individual sender, e.g., the number of multiple scans performed per confirmation number generated by each sender, and delivery areas, e.g., the number of multiple scans performed per specific geographic area. If the sender's profile differs significantly from the normal operational variations, there is an indication of potential fraudulent activity and an investigation can be initiated. By analyzing a combination of sender and delivery scan data with system wide scan data, the effect of inconsistent data is minimized to significantly reduce the number of erroneous indications of fraudulent activity while still providing a high level of fraud detection.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description.

What is claimed is:

1. In a verification system including a processing device, the verification system having items intended for a single use, in which usage of an item is confirmed by scanning an identification number associated with the item, and wherein scanning activity is inconsistent, a method for identifying a suspect for fraudulent use of the identification numbers comprising:

creating, by the processing device, a profile of scanning activity for a plurality of items that meet a first parameter, the profile including a percentage of items that meet the first parameter that have been scanned more than once;

creating, by the processing device, a profile of scanning activity for a plurality of items used by a specified user, the profile including a total number of scans for items used by the specified user that meet the first parameter and a percentage of items used by the specified user that meet the first parameter that have been scanned more than once;

analyzing, by the processing device, the profile of scanning activity for the plurality of items used by the specified user to determine that the total number of scans for items used by the specified user that meet the first parameter exceeds a predetermined minimum number and that the percentage of items used by the specified user that meet the first parameter that have been scanned more than once is greater than a first threshold value, the first threshold value being based on the percentage of items that meet the first parameter that have been scanned more than once from the profile of scanning activity for the plurality of items that meet the first parameter; and identifying, by the processing device, the specified user as a suspect for fraudulent use of the identification numbers.

2. The method of claim 1, wherein before identifying the specified user as a suspect for fraudulent use of the identification numbers the method further comprises:

determining if an extended fraud detection check is required;

if it is determined that an extended fraud detection is required, performing the extended fraud detection; and if it is determined that an extended fraud detection check is not required, then identifying the specified user as a suspect for fraudulent use of the identification numbers.

3. The method of claim 2, wherein performing the extended fraud detection check further comprises:

creating, by the processing device, a profile of scanning activity for a plurality of items used by the specified user that meet a second parameter, the second parameter being a subset of the first parameter, the profile of scanning activity for the plurality of items used by the specified user that meet the second parameter including a total number of scans for items used by the specified user that meet the second parameter and a percentage of items used by the specified user that meet the second parameter which have been scanned more than once;

analyzing, by the processing device, the profile of scanning activity for the plurality of items used by the specified user that meet the second parameter to determine that the total number of scans for items used by the specified user that meet the second parameter is greater than a predetermined minimum number for the second parameter and that the percentage of items used by the specified user that meet the second parameter that have been scanned more than once is greater than a second threshold value; and identifying the specified user as a suspect for fraudulent use of the identification numbers.

4. The method of claim 3, wherein the first parameter is use of the item in a first geographic region, and the second parameter is use of the item in a second geographic region, the second geographic region being a subset of the first geographic region.

5. The method of claim 1, wherein the profile of scanning activity for a plurality of items that meet the first parameter further includes a total number of scans performed.

6. The method of claim 5, wherein the profile of scanning activity for a plurality of items that meet the first parameter further includes a percentage of identification numbers scanned more than once within a predetermined period of time and a percentage of identification numbers scanned more than once on different days.

7. The method of claim 1, wherein the items are indicia that evidence payment of postage for mail pieces.

8. The method of claim 7, wherein the identification number is a delivery confirmation number.

9. The method of claim 7, wherein the first parameter is a class of service for the mail pieces.

10. The method of claim 1, wherein the item are coupons.

11. The method of claim 1, wherein the first parameter is use of an item in a first geographic region.

12. A system for identifying a suspect for fraudulent use of identification numbers associated with items intended for a single use, wherein usage of an item is confirmed by scanning the identification number associated with the item, and wherein scanning activity is inconsistent, the system comprising:

a database for storing data associated with scanning the identification numbers;

a processing device coupled to the database, the processing device being configured to create a profile, from the data stored in the database, of scanning activity for a plurality of items that meet a first parameter, the profile including a percentage of items that meet the first parameter that have been scanned more than once;

create, from the data stored in the database, a profile of scanning activity for a plurality of items used by a specified user, the profile including a total number of scans for items used by the specified user that meet the first parameter and a percentage of items used by the specified user that meet the first parameter that have been scanned more than once;

analyze the profile of scanning activity for the plurality of items used by the specified user to determine that the total number of scans for items used by the specified user that meet the first parameter exceeds a predetermined minimum number and that the percentage of items used by the specified user that meet the first parameter that have been scanned more than once is greater than a first threshold value, the first threshold value being based on the percentage of items that meet the first parameter that have been scanned more than once from the profile of scanning activity for the plurality of items that meet the first parameter; and identify the specified user as a suspect for fraudulent use of the identification numbers based on the percentage of items used by the specified user that meet the first parameter that have been scanned more than once from the profile of scanning activity for the plurality of items used by a specified user being greater than the first threshold value.

13. The system of claim 12, wherein the processing device is further configured to determine if an extended fraud detection check is required, wherein before identifying the specified user as a suspect for fraudulent use of the identification numbers, it is determined if an extended fraud detection check is required, and if it is determined that an extended fraud detection check is required, the extended fraud detection check is performed, and if it is determined that an extended fraud detection check is not required, then the specified user is identified as a suspect for fraudulent use of the identification numbers.

14. The system of claim 13, wherein the processing device is further configured to create, from data stored in the database, a profile of scanning activity for a plurality of items used by the specified user that meet a second parameter, the second parameter being a subset of the first parameter, the profile of scanning activity for the plurality of items used by the specified user that meet the second parameter including a total number of scans for items used by the specified user that meet the second parameter and a percentage of items used by the specified user that meet the second parameter that have been scanned more than once;

analyze the profiled of scanning activity for the plurality of items used by the specified user that meet the second parameter to determine that the total number of scans for items used by the specified user that meet the second parameter is greater than a predetermined minimum number for the second parameter and that the percentage of items used by the specified user that meet the second parameter that have been scanned more than once is greater than a second threshold value, and to identify the specified user as a suspect for fraudulent use of the identification numbers based on the percentage of items used by the specified user that meet the second parameter that have been scanned more than once being greater than the second threshold value.

15. The system of claim 14, wherein the first parameter is use of an item in a first geographic region, and the second parameter is use of an item in a second geographic region, the second geographic region being a subset of the first geographic region.

16. The system of claim 12, wherein the profile of scanning activity for a plurality of items used that meet the first parameter further includes a total number of scans performed.

17. The system of claim 16, wherein the profile of scanning activity for a plurality of for items used that meet the first parameter further includes a percentage of identification numbers scanned more than once within a predetermined period of time and a percentage of identification numbers scanned more than once on different days.

18. The system of claim 12, wherein the items are indicia that evidence payment of postage for mail pieces.

19. The system of claim 18, wherein the identification number is a delivery confirmation number.

20. The system of claim 18, wherein the first parameter is a class of service for the mail pieces.

21. The system of claim 12, wherein the item are coupons.

22. The system of claim 12, wherein the fist parameter is use of an item in a first geographic region.

* * * * *